United States Patent
Baker et al.

(10) Patent No.: US 7,109,681 B2
(45) Date of Patent: Sep. 19, 2006

(54) PARALLEL INVERTER MOTOR DRIVE WITH IMPROVED WAVEFORM AND REDUCED FILTER REQUIREMENTS

(75) Inventors: Donal E. Baker, Rockford, IL (US); Byron R. Mehl, Belvidere, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/926,163

(22) Filed: Aug. 25, 2004

(65) Prior Publication Data
US 2006/0043922 A1    Mar. 2, 2006

(51) Int. Cl.
*H02M 1/12* (2006.01)
(52) U.S. Cl. ............... 318/801; 363/41; 363/71
(58) Field of Classification Search ........ 318/722, 318/800, 801; 363/34–36, 40, 41, 71, 72
See application file for complete search history.

(56) References Cited

U.S. PATENT DOCUMENTS

| | | | |
|---|---|---|---|
| 5,012,177 A | * | 4/1991 | Dhyanchand et al. ........ 322/10 |
| 5,142,468 A | * | 8/1992 | Nerem ..................... 363/71 |
| 5,434,771 A | * | 7/1995 | Danby et al. ............... 363/71 |
| 5,657,214 A | * | 8/1997 | Nguyen et al. ............ 363/41 |
| 6,370,049 B1 | * | 4/2002 | Heikkil.ang. ............. 363/71 |
| 2004/0071003 A1 | * | 4/2004 | Cocconi .................. 363/132 |

OTHER PUBLICATIONS

Sedra/Smith; "Microelectronic Circuits", Oxford University Press, 1998. p. 202 shows a filter circuit for a power supply.*
The Radio Amateur's Handbook, Fifty-First Edition, 1974. p. 115 shows "Capacitive-Input Filters".*

* cited by examiner

*Primary Examiner*—Bentsu Ro
(74) *Attorney, Agent, or Firm*—Stephen G. Mican

(57) ABSTRACT

An improved motor controller for driving polyphase alternating current dynamoelectric machines from a direct current power source that employs two inverter bridges controlled with a state vector modulation symmetrical state sequence that has a desired "chop" frequency so that each of their outputs produce a fundamental component that is exactly in phase but chop frequency components that are exactly 180 degrees out of phase with each other, with their outputs combined through respective interphase transformers to average the potentials of the chop frequency components.

11 Claims, 2 Drawing Sheets

PARALLEL INVERTER MOTOR DRIVE WITH IMPROVED WAVEFORM AND REDUCED FILTER REQUIREMENTS

FIELD OF THE INVENTION

The invention relates to a motor controller (MC) for powering and controlling alternating current (AC) dynamoelectric machines from a direct current (DC) power source, and more particularly to a light weight, high power MC for high power polyphase AC dynamoelectric machines used in a variety of aeronautical applications.

BACKGROUND OF THE INVENTION

A MC is used in conjunction with an AC dynamoelectric machine to provide variable and controllable speed for a multiplicity of applications. It converts a DC power source to polyphase AC of suitable power and frequency to drive the AC dynamoelectric machine for such applications.

In aircraft, a MC has uses for both low power and high power applications. One high power application is main engine starting, which may be accomplished with a MC and a dynamoelectric machine that functions as a starter motor and a main electrical power generator. Another such aeronautical high power application is the use of a MC for an electric motor driven hydraulic pump (HP). In aircraft, it is common practice to use the main engine starting MC to serve another function after the engine is started, such as controlling other motor drives, also requiring high power ratings.

It is common for the HPs and other aeronautical motor drives to operate a very high rotational speed to minimize size and weight of the motor. Associated with this high speed is a relatively high frequency required from the MC. Speeds of 42 krpm and 84 krpm are not unusual with operating frequencies up to 1300 or 1400 Hz. On the other hand, at the associated power levels of 100 kW to 200 kW needed for these applications, the switching frequencies for the MC power transistors, typically insulated gate bipolar transistors (IGBTs), are typically limited to about 10 kHz maximum.

It is well known that motors need the low order harmonic potentials and currents up to about the $7^{th}$ harmonic minimised or eliminated to provide efficient operation of the motor. With switching inverter type motor drives, it is also known that control of frequency components in terms of being able to produce or eliminate them requires a switching frequency at least two times the highest frequency of concern. Thus, for effective minimisation of the $7^{th}$ harmonic of 1400 Hz motors, 9800 Hz, we need about 20 kHz for the switching frequency. Operating IGBTs at this frequency and the requisite power levels will result in unacceptable losses. Ten kHz is considered an acceptable maximum switching frequency for these applications.

Another requirement for airborne applications is filtering of the MC's input and output. In the non-aeronautical industrial field, it is customary to filter the input, but not the output, of the MC. This is because the MC is generally dedicated to a single motor and is either located in extremely close proximity to the motor, or shielding over the wiring between the MC and motor is used. In aircraft applications, the MC may be required to serve more than one motor and/or located at relatively large distance from the motor. Shielding of the MC-to-motor wiring is generally not acceptable because of increased weight and increased heating in the wiring caused by the close bundling and reduced air circulation that shielding causes.

It is known that filtering applied to the output of the motor drive is detrimental to the system performance because it inherently extracts a portion of the fundamental torque producing potential and current delivered to the motor. It is also generally accepted that higher MC switching frequencies result in an output filter design that reduce the loss of fundamental potential and current delivered to the motor. It is further known if the MC inverter switching frequency is insufficient to eliminate the $5^{th}$ and $7^{th}$ harmonics potentials, then the addition of an output filter is not a practical solution and it can increase the presence of those unwanted harmonics.

SUMMARY OF THE INVENTION

The invention comprises an improved motor controller for driving polyphase alternating current dynamoelectric machines from a DC power source that employs two inverter bridges controlled with a state vector modulation symmetrical state sequence that has a desired "chop" frequency so that each of their outputs produce a fundamental component that is exactly in phase but chop frequency components that are exactly 180 degrees out of phase with each other, with their outputs combined through respective interphase transformers to average the potentials of the chop frequency components.

In a preferred embodiment, the invention comprises an improved motor controller for driving polyphase AC dynamoelectric machines from a DC power source, comprising: a pair of inverter bridges controlled with a state vector modulation symmetrical state sequence that has a desired "chop" frequency so that each of their outputs produce a fundamental component that is exactly in phase but chop frequency components that are exactly 180 degrees out of phase with each other; and a plurality of interphase transformers to combine the outputs of the inverter bridges and average the potentials of the chop frequency components.

DETAILED DESCRIPTION OF THE INVENTION

Figure 1:
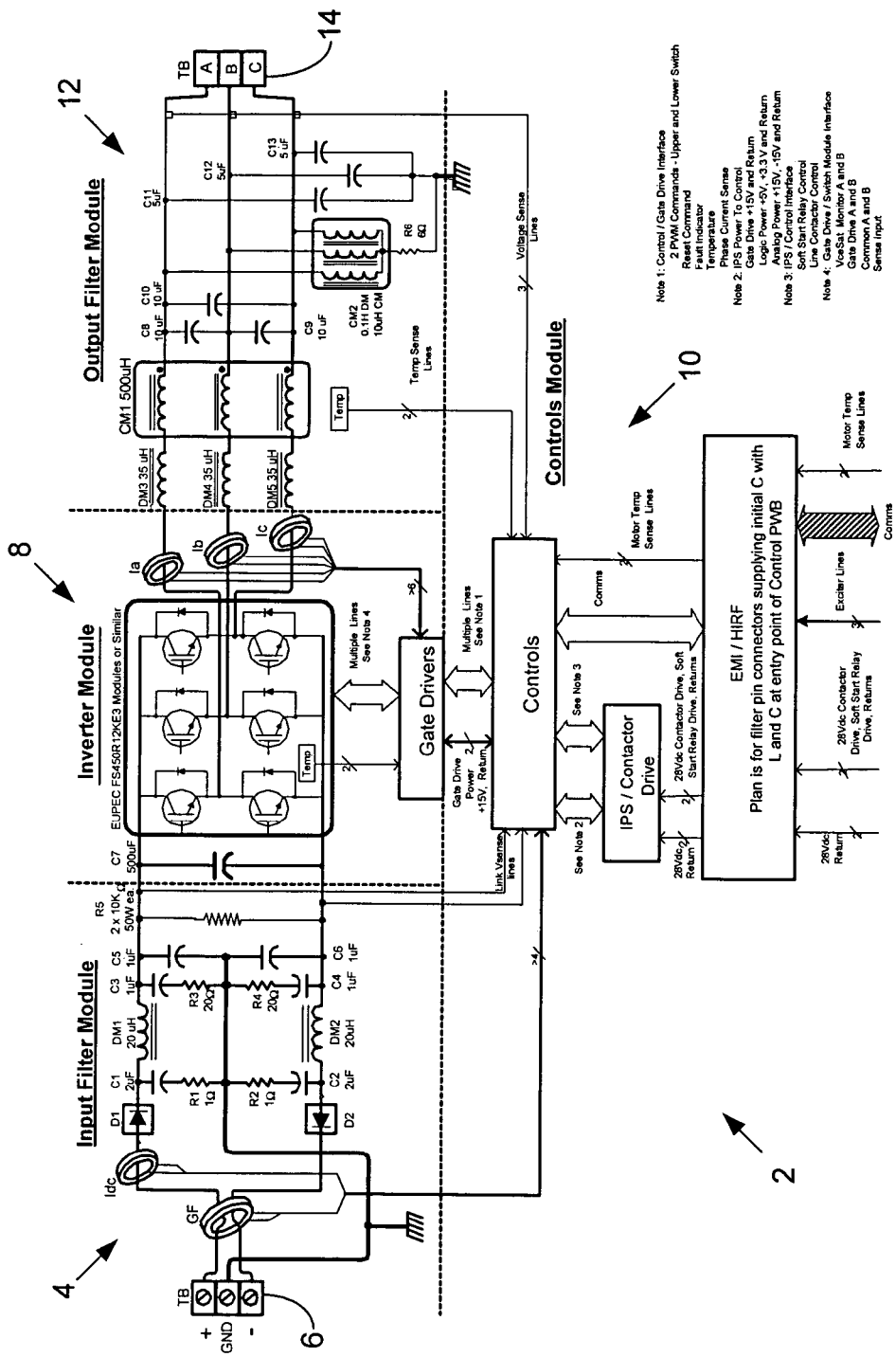
FIG. 1 shows a schematic diagram of a motor controller for high-power aeronautical applications according to the prior art.

FIG. 1 shows a schematic diagram of a MC 2 for high-power aeronautical applications according to the prior art. The MC 2 has an input filter module 4 that filters extraneous AC currents from DC power applied to a MC DC input terminal 6. An inverter module 8 converts the filtered DC power to AC for an application. Polyphase AC applications aboard aircraft are generally three phase, so the inverter module 8 typically comprises a DC to three phase AC inverter bridge that converts the filtered DC power to three phase AC power. A pair of transistors, typically IGBTs, is used for each phase, so that the inverter module 8 comprises six IGBTs.

A controls module 10 switches each of the transistor pairs for each phase to produce AC power at a desired frequency within a range of frequencies for an application. An output filter module 12 filters the AC power to remove extraneous harmonics that result from the inversion process and feeds the filtered AC power to an MC output terminal 14.

Figure 2:
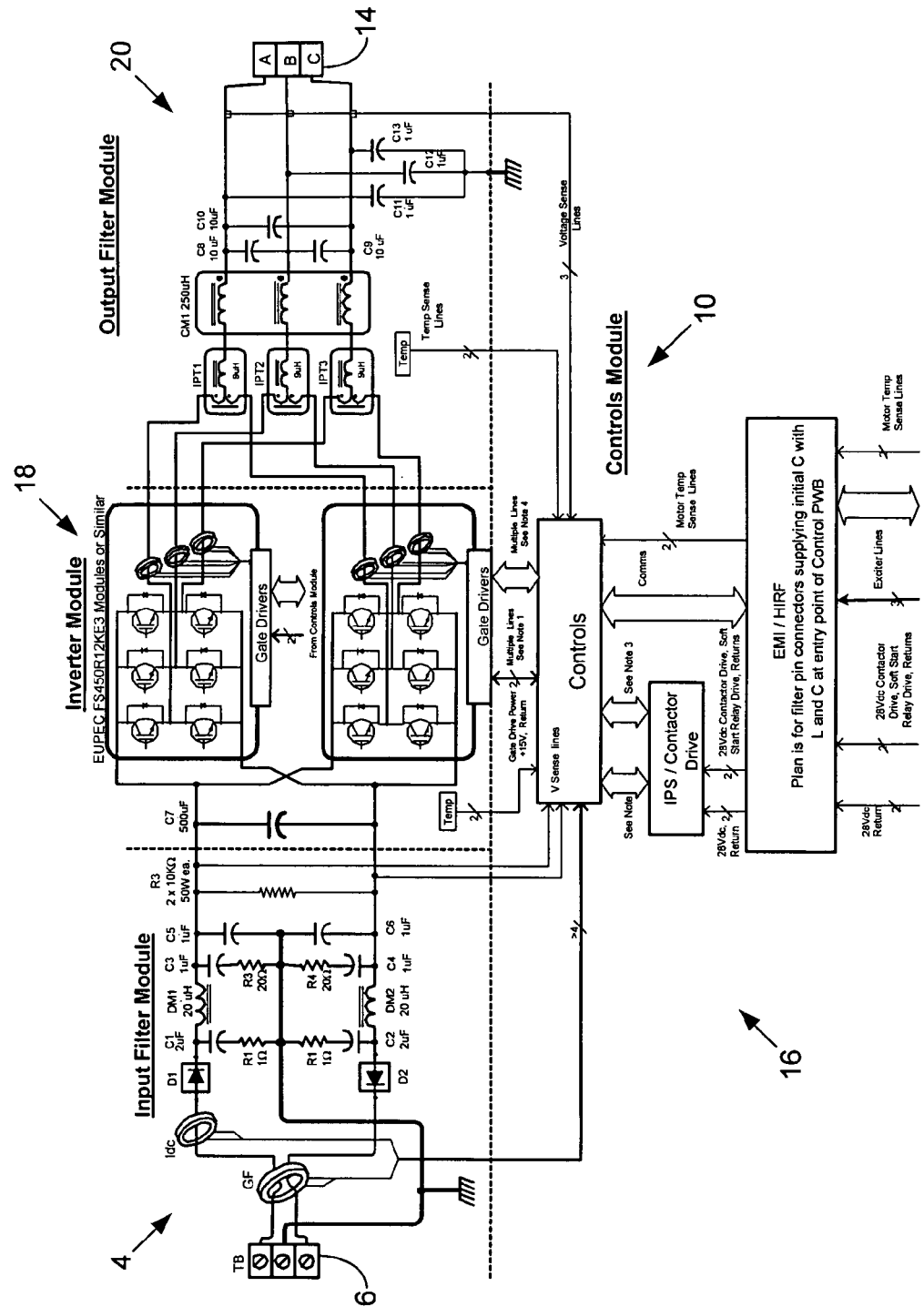
FIG. 2 shows a schematic diagram of a motor controller for high-power aeronautical applications according to a preferred embodiment of the invention.

FIG. 2 shows a schematic diagram of a MC according to a preferred embodiment of the invention. The MC 16 has the input filter module 4 that filters extraneous AC currents from DC power applied to the MC DC input terminal 6 as described above for the MC 2. However, the inverter module 8 and the output filter module 12 are replaced with modified modules as described below.

The invention uses an inverter module 18 that has two inverter IGBT bridges. The outputs of the two inverter bridges are then connected in parallel on each phase leg as described below. In high power applications, it is sometimes necessary to parallel two inverter IGBT modules in order to obtain sufficient current rating. For those situations, the two requisite inverter IGBT bridges in the inverter module 16 are provided with no penalty in terms of cost, size or weight.

Modern motor control theory provides that after the desired synchronous motor potential control signals, $v_d$ and $v_q$, have been developed and converted from 2-phase to 3-phase quantities it is necessary to perform some sort of modulation to drive the motor controller inverter switches so as to provide the desired motor currents. The general approach is to use space vector modulation (SVM), a technique that provides very good fundamental potential with minimal harmonics and ripple currents. The SVM operates at a chop frequency that is independent of the fundamental frequency. Those familiar with SVM understand that there are several different state sequences available to the designer within a given sector. Some sequences are symmetrical or centre-aligned while others are not. By carefully selecting and controlling the sequence for each of the two inverter bridges in the inverter module 16 with the controls module 10 it is possible to have each one provide a fundamental component that is exactly in phase with the other, but have an effective "chop" frequency that is exactly 180 degrees out of phase with the other.

The potential from each inverter bridge in the inverter module 18 is then identical relative to the fundamental potential that results in torque producing currents but instantaneously opposing relative to "modulation" or chop frequency potential. This instantaneous difference in potential requires a device to absorb the difference. An interphase transformer (IPT) is commonly used for this purpose and it effectively averages the two potentials, instantaneously. Because the difference potential pertains to the high chop frequency and not the low fundamental frequency, the IPT can be made with relatively small size and weight. The "averaged" potential from the IPT output is, essentially, equivalent to a single inverter operating at double the chop frequency of the constituent inverters. Specifically, it is capable of eliminating higher harmonic frequency components of potential/current and will provide lower levels of ripple potential/current. This is very beneficial to larger motor drives where chop frequency of an individual inverter is practically limited to about 10 kHz. With this new approach according to the invention, motors operating up to 1500 Hz fundamental frequency, a 10 kHz chop frequency includes the $5^{th}$ and $7^{th}$ harmonics of 1500 Hz. This ensures good harmonic control, since the $5^{th}$ and $7^{th}$ harmonics may be minimised.

A modified output filter module 20 for the MC 16 comprises the requisite IPTs to combine the output from the two inverter bridges in the inverter module 18 as described above. In depth simulation analyses shows that the output filter 20 benefits substantially from this mode of operation. Most notably is that the common mode inductance can be cut in half and the differential inductance can be cut by 75 percent and the common mode damper/inductor can be eliminated from the baseline single inverter bridge arrangement with direct paralleled modules whilst meeting the same EMI/PQ performance limits. This savings in electromagnetic filter components and weight can be used to offset the addition of the requisite IPTs.

Furthermore, because the differential inductance is reduced to such a small requirement, it becomes practical to combine the inductor and the IPT into a single, near optimum, device. The IPT/inductor retains the desirable properties of a near ideal interphase transformer, such as no air gap, low magnetizing current and good coupling, in the differential path and provide the equivalent of a series inductor in the common path.

Described above is an improved motor controller for driving polyphase AC dynamoelectric machines from a DC power source that employs two inverter bridges controlled with a state vector modulation symmetrical state sequence that has a desired "chop" frequency so that each of their outputs produce a fundamental component that is exactly in phase but chop frequency components that are exactly 180 degrees out of phase with each other, with their outputs combined through respective interphase transformers to average the potentials of the chop frequency components. It should be understood that this embodiment is only an illustrative implementation of the invention, that the various parts and arrangement thereof may be changed or substituted, and that the invention is only limited by the scope of the attached claims.

What is claimed is:

1. An improved motor controller for driving polyphase alternating current (AC) dynamoelectric machines from a direct current (DC) power source, comprising:
   a pair of inverter bridges for converting DC power from the DC power source to polyphase AC and controlled with a state vector modulation symmetrical state sequence that has a desired "chop" frequency so that each of their outputs produce a fundamental component that is exactly in phase but chop frequency components that are exactly 180 degrees out of phase with each other; and
   a plurality of centre-tapped interphase transformers to combine the outputs of the inverter bridges and average the potentials of the chop frequency components through the centre taps of the interphase transformers.

2. The motor controller of claim 1, wherein the polyphase AC is three phase and each inverter bridge has a three phase output.

3. The motor controller of claim 2, wherein the plurality of interphase transformers comprise three interphase transformers, with each interphase transformer combining respective phases of the outputs of both inverter bridges.

4. The motor controller of claim 3, further comprising an output filter for filtering extraneous harmonics from an output of the motor controller.

5. The motor controller of claim 4, wherein the interphase transformers are part of the output filter.

6. The motor controller of claim 1, further comprising controls for controlling the inverter bridges at the desired chop frequency.

7. The motor controller of claim 1, further comprising an input filter for filtering extraneous AC components from the DC power.

8. An improved motor controller for driving polyphase alternating current (AC) dynamoelectric machines from a direct current (DC) power source, comprising:

a pair of inverter bridges for converting DC power from the DC power source to polyphase AC and controlled with a state vector modulation symmetrical state sequence that has a desired "chop" frequency so that each of their outputs produce a fundamental component that is exactly in phase but chop frequency components that are exactly 180 degrees out of phase with each other;

an output filter comprising a plurality of centre-tapped interphase transformers to combine the outputs of the inverter bridges, average the potentials of the chop frequency components through the centre tans of the interphase transformers and filter extraneous harmonics from an output of the motor controller;

controls for controlling the inverter bridges at the desired chop frequency; and an input filter for filtering extraneous AC components from the DC power.

9. The motor controller of claim 8, wherein the polyphase AC is three phase and each inverter bridge has a three phase output.

10. The motor controller of claim 9, wherein the plurality of interphase transformers comprise three interphase transformers, with each interphase transformer combining respective phases of the outputs of both inverter bridges through its centre tap.

11. An improved motor controller for driving three phase alternating current (AC) dynamoelectric machines from a direct current (DC) power source, comprising:

a pair of inverter bridges with three phase outputs for converting DC power from the DC power source to three phase AC and controlled with a state vector modulation symmetrical state sequence that has a desired "chop" frequency so that each of their outputs produce a fundamental component that is exactly in phase but chop frequency components that are exactly 180 degrees out of phase with each other;

an output filter comprising three centre-tapped interphase transformers to combine the outputs of the inverter bridges, average the potentials of the chop frequency components through the centre taps of the interphase transformers and filter extraneous harmonics from an output of the motor controller, with each interphase transformer combining respective phases of the outputs of both inverter bridges through its centre tap;

controls for controlling the inverter bridges at the desired chop frequency; and an input filter for filtering extraneous AC components from the DC power.

* * * * *